US010931317B2

(12) United States Patent
Fox et al.

(10) Patent No.: US 10,931,317 B2
(45) Date of Patent: Feb. 23, 2021

(54) FREQUENCY RE-BANDER WITH UE AND DOPPLER CORRECTION

(71) Applicant: Cubic Corporation, San Diego, CA (US)

(72) Inventors: Andrew John Fox, Chippenham (GB); Matthew Parry, Chippenham (GB)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 16/250,257

(22) Filed: Jan. 17, 2019

(65) Prior Publication Data

US 2019/0222239 A1 Jul. 18, 2019

Related U.S. Application Data

(60) Provisional application No. 62/618,504, filed on Jan. 17, 2018.

(51) Int. Cl.
*H04B 1/00* (2006.01)
*H04W 64/00* (2009.01)
(Continued)

(52) U.S. Cl.
CPC .......... *H04B 1/0096* (2013.01); *H04B 7/01* (2013.01); *H04W 56/0035* (2013.01); *H04W 64/006* (2013.01); *H04B 2215/065* (2013.01)

(58) Field of Classification Search
CPC .......... H04W 56/0035; H04W 36/32; H04W 56/0045; H04W 16/28; H04W 4/027; H04W 4/40; H04W 56/002; H04W 56/0055; H04W 64/00; H04W 64/003; H04W 88/08; G01S 19/428; G01S 19/11; G01S 19/12; G01S 19/22; G01S 19/23;
(Continued)

(56) References Cited

U.S. PATENT DOCUMENTS

2009/0225662 A1* 9/2009 Tsai .................. H04B 7/2675
370/242
2009/0309787 A1 12/2009 Gildea
(Continued)

FOREIGN PATENT DOCUMENTS

WO 2017/029036 A1 2/2017

OTHER PUBLICATIONS

International Search Report and Written Opinion dated May 6, 2019 in related PCT application No. PCT/US2019/013956, 14 pgs.
(Continued)

*Primary Examiner* — Golam Sorowar
(74) *Attorney, Agent, or Firm* — Kilpatrick Townsend & Stockton, LLP (57) ABSTRACT

Techniques are provided for providing Doppler correction. In particular, embodiments may provide re-banding circuitry having a reference clock, a mixer, and a compensation circuitry for re-banding and for Doppler correction. The compensation circuitry may be configured to adjust a reference frequency of the reference clock based on signals received from a Global Navigation Satellite System (GNSS) receiver. The mixer may be configured to translate communication signals in a first frequency band to a second frequency band based at least in part on the adjusted reference frequency of the reference clock.

19 Claims, 5 Drawing Sheets

(51) Int. Cl.
  *H04B 7/01* (2006.01)
  *H04W 56/00* (2009.01)

(58) Field of Classification Search
  CPC ........ G01S 19/25; G01S 19/256; G01S 19/34;
    G01S 19/36; G01S 19/37; G01S 19/46;
    G01S 19/51
  See application file for complete search history.

(56) References Cited

U.S. PATENT DOCUMENTS

| | | | | |
|---|---|---|---|---|
| 2010/0331032 | A1* | 12/2010 | Lipka | H04B 7/01 455/509 |
| 2011/0189949 | A1 | 8/2011 | Fox et al. | |
| 2013/0021193 | A1* | 1/2013 | Hermsen | G01S 5/12 342/51 |
| 2013/0329721 | A1* | 12/2013 | Doetsch | H04L 27/0014 370/350 |
| 2015/0147960 | A1* | 5/2015 | Hanson | H04B 7/15528 455/23 |
| 2016/0035096 | A1* | 2/2016 | Rudow | G06F 16/51 348/135 |
| 2016/0173162 | A1* | 6/2016 | Lundstedt | H04B 1/40 455/76 |
| 2016/0259061 | A1 | 9/2016 | Carter | |
| 2017/0208600 | A1* | 7/2017 | Hsu | G01S 11/10 |
| 2019/0260462 | A1* | 8/2019 | Axmon | H04B 7/18506 |

OTHER PUBLICATIONS

WiBE (Wirelss Broadband Extender) retrieved from website http://deltenna.com/products/wibe/ on Apr. 1, 2019; Registered in England and Wales Company No. 04385166; Vat No. 800577154; 2002-2019 Deltenna Ltd, 2 pages.

* cited by examiner

FREQUENCY RE-BANDER WITH UE AND DOPPLER CORRECTION

CROSS-REFERENCES TO RELATED APPLICATIONS

The present application claims the benefit under 35 USC § 119(e) of U.S. Provisional Application No. 62/618,504, filed on Jan. 17, 2018, entitled "Frequency Re-bander with UE and Doppler Correction," which is incorporated by reference herein in its entirety.

BACKGROUND

There are many applications where having an ability to deploy a wide area network (WAN) that employs data communication technologies (such as Long-Term Evolution (LTE)), in any available spectrum is highly desirable. Such applications can include, for example, WAN deployments in new/emerging markets, military and/or other non-civilian applications, deployment in regions in which traditional cellular frequencies may not desirable (due to physical and/or electronic interference, etc.) and the like. The utilization of frequency "re-banding" technology allows for the creation of a data communication network that uses established data communication technologies on any available spectrum. In some applications, the communication device may be moving at speed, which can cause Doppler shift in the communication frequency, and link errors occur and eventually, the link will fail as the communication device travels exceeding a maximum speed that can be supported by the network. Traditional re-bander units, however, lack the ability to correct for Doppler shift.

BRIEF SUMMARY

Techniques are provided herein for a standard data communication technology to work in any frequency band and on platforms traveling at speed not supported by commercial off-the-shelf devices and/or by the standard data communication technology.

In one aspect, a frequency re-bander unit may include an interface configured to communicate with a first communication system in a first frequency band. The re-bander unit may further include re-banding circuitry. The re-banding circuitry may include a reference clock, a Global Navigation Satellite System (GNSS) receiver, compensation circuitry, and a mixer. The reference clock may be configured to produce a reference frequency. The GNSS receiver may be configured to receive a timing signal from a satellite positioning system and to output a strobe signal based on the timing signal. The compensation circuitry may be configured to receive the strobe signal output by the GNSS receiver and to determine speed information of the first communication system. The speed information may be indicative of at least a speed of the first communication system. The compensation circuitry may be further configured to determine a Doppler correction based on the speed information of the first communication system and to adjust the reference frequency of the reference clock based at least in part on at least one of the strobe signal or the Doppler correction. The mixer may be configured to translate signals received from the first communication system to a second frequency band based at least in part on the adjusted reference frequency of the reference clock. The mixer may be further configured to cause the translated signals to be transmitted in the second frequency band.

In some embodiments, the GNSS receiver may be further configured to receive a positioning signal from the satellite positioning system. The compensation circuitry may be further configured to determine the speed information of the first communication system based at least in part on the positioning signal. In some embodiments, the speed information may be further indicative of relative motion between the first communication system and a second communication system configured to receive the translated signals. The compensation circuitry may be further configured to obtain a location of the second communication system. The compensation circuitry may be further configured to determine the relative motion between the first communication system and the second communication system based at least in part on the positioning signal and the location of the second communication system. In some embodiments, the compensation circuitry may be further configured to determine the speed information of the first communication system based at least in part on speed information obtained from the first communication system or a moving platform on which the first communication system may be located.

In some embodiments, the compensation circuitry may be further configured to determine the Doppler correction based at least in part on a maximum Doppler shift causable by the first communication system. In some embodiments, the compensation circuitry may be further configured to determine and adjust the Doppler correction based at least in part on predetermined connection parameters indicative of data link quality or data link stability. In some embodiments, the compensation circuitry may be further configured to adjust the reference frequency of the reference clock upon determining that the first communication system may be moving at a speed equal to or exceeding a threshold speed.

In some embodiments, the first communication system may include a user equipment (UE). In some embodiments, the mixer may be further configured to transmit the translated signals to a base station. In some embodiments, the reference clock may include a voltage controller. The voltage controller may be configured to adjust the reference frequency of the reference clock based at least in part on at least one of the strobe signal received from the GNSS receiver or the Doppler correction determined by the compensation circuitry.

In one aspect, a method for correcting Doppler shift using a re-bander unit may include receiving, from a first communication system, a first signal in a first frequency band. The method may further include receiving, from a satellite positioning system, a timing signal, and adjusting, based at least in part on the timing signal, a reference frequency of a reference clock of the re-bander unit. The method may further include obtaining speed information of the first communication system. The speed information may be indicative of at least a speed of the first communication system. The method may further include determining, based on the speed information, a Doppler correction, and adjusting, based at least in part on the Doppler correction, the reference frequency of the reference clock of the re-bander unit. The method may further include translating, based on the adjusted reference frequency, the first signal in the first frequency band to a second signal in a second frequency band. The method may further include transmitting the second signal in the second frequency band.

In some embodiments, the method may further include receiving, from the satellite positioning system, a positioning signal. The speed information of the first communication system may be obtained based at least in part on the positioning signal received from the satellite positioning system. In some embodiments, the speed information may be further indicative of relative motion between the first communication system and a second communication system configured to receive the second signal. The method may further include obtaining a location of the second communication system. The method may further include determining the relative motion between the first communication system and the second communication system based at least in part on the positioning signal and the location of the second communication system. In some embodiments, the speed information of the first communication system may be obtained from the first communication system or a moving platform on which the first communication system may be located.

In some embodiments, the method may further include determining a maximum

Doppler shift causable by the first communication system. Adjusting the reference frequency of the reference clock may include adjusting the reference frequency based at least in part on the maximum Doppler shift until a connection may be established between the first communication system and a second communication system configured to receive the second signal.

In some embodiments, the method may further include determining at least one of data link quality or data link stability between the first communication system and a second communication system configured to receive the second signal. Adjusting the reference frequency of the reference clock may include adjusting the reference frequency of the reference clock based on at least one of the data link stability or the data link stability.

In some embodiments, the method may further include receiving, from a second communication system, a third signal in the second frequency band. The method may also include translating, based on the adjusted reference frequency, the third signal from the second communication system in the second frequency band to a fourth signal in the first frequency band. The method may further include transmitting the fourth signal to the first communication system.

In some embodiments, the method may further include receiving, from a second communication system, a third signal in a third frequency band. The third frequency band may be different from the second frequency band. The method may also include translating, based on the adjusted reference frequency, the third signal from the second communication system in the third frequency band to a fourth signal in a fourth frequency band. The fourth frequency band may be different from the first frequency band. The method may further include transmitting the fourth signal to the first communication system.

In some embodiments, the first communication system may include a user equipment (UE). In some embodiments, the second signal may be transmitted by the re-bander unit to a base station.

BRIEF DESCRIPTION OF THE DRAWINGS

For a more complete understanding of this invention, reference is now made to the following detailed description of the embodiments as illustrated in the accompanying drawings, in which like reference designations represent like features throughout the several views and wherein.

In the appended figures, similar components and/or features may have the same reference label. Further, various components of the same type may be distinguished by following the reference label by a dash and a second label that distinguishes among the similar components. If only the first reference label is used in the specification, the description is applicable to any or all of the similar components having the same first reference label, irrespective of the second reference label.

DETAILED DESCRIPTION OF THE INVENTION

The ensuing description provides embodiments only, and is not intended to limit the scope, applicability or configuration of the disclosure. Rather, the ensuing description of the embodiments will provide those skilled in the art with an enabling description for implementing an embodiment. It is understood that various changes may be made in the function and arrangement of elements without departing from the scope.

It can be noted that, although embodiments and terminology provided herein are in reference to LTE or other mobile communication technology, other wireless technologies can be used in addition or as an alternative to LTE to communicate with a wide area network (WAN) or other digital communication network. These technologies can include, for example, fifth-generation (5G) New Radio (NR) or Nth Generation (NG) wireless standards and protocols. A person of ordinary skill in the art will appreciate that such standards evolve, and that new equivalent standards may take their place.

It can be further noted that embodiments provided herein can be utilized for Time Division Duplex (TDD) and/or Frequency Division Duplex (FDD) operability, depending on desired functionality.

Additionally, as used, the term "transmit signal" is used to describe a signal to be transmitted provided by the UE to a re-bander unit. Conversely, the term "received signal" is used to describe signal detected by an antenna, to be provided by the re-bander unit to the UE after re-banding.

Figure 1:
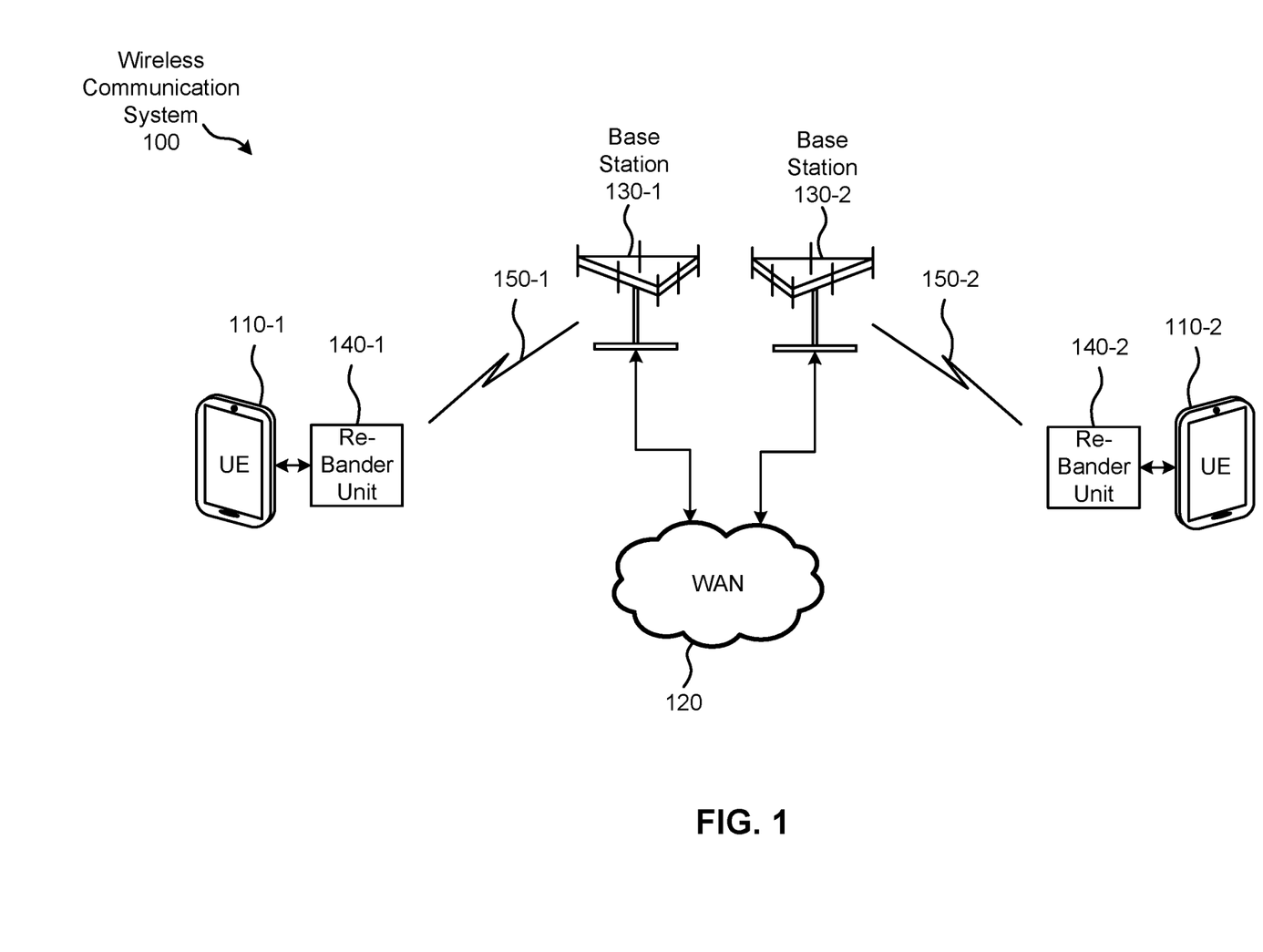
FIG. 1 is a simplified illustration of a wireless communication system, according to an embodiment.

FIG. 1 is a simplified illustration of a wireless communication system 100, according to an embodiment. As discussed herein below, the wireless communication system 100 may be capable of providing communication (e.g. voice and/or data) between UEs 110 connected with a WAN 120 via base stations 130.

It can be noted that, to avoid clutter, the wireless communication system 100 includes only two UEs 110 and two base stations 130. However, a person of ordinary skill in the art will appreciate that some embodiments may have any number of UEs 110 and/or base stations 130, and that the number of UEs 110 may be different than the number of base stations 130. For example, in a given operational environment, the wireless communication system 100 may comprise dozens, hundreds, or even thousands (or more) of UEs 110. Moreover, embodiments additionally or alternatively may include any number of base stations 130.

In brief, the wireless communication system 100 may be deployed similarly to a traditional mobile communication network and may be able to communicate using high-bandwidth mobile communication standards, such as LTE or other cellular technologies, thereby giving the wireless communication system a very high throughput capacity, relative to other wireless communication techniques. As opposed to a traditional mobile communication network, however, the wireless communication system 100 employs re-bander units 140 that enable UEs 110 designed for use with traditional mobile communication networks to communicate using frequencies that may not be used in the traditional mobile communication networks. As used herein, the term "re-bander unit" may refer to a re-bander circuitry within a device, a re-bander device, or a re-bander system employing multiple devices, depending on the implementations. As used herein, the term "wireless communication frequency" refers to the frequency band(s) of the wireless signals 150 used by the re-bander units 140 to communicate with the base stations 130. Conversely, the term "UE communication frequency" refers to the frequency band(s) used by the UEs 110 natively.

Such a re-banding may be applied in a variety of applications. For example, military organizations often use Mobile Ad hoc NETworks (MANETs), which may be deployed in an area in which a traditional mobile communication network is not available, or in which it is not desirable to use such a network. These MANETs often use non-commercial frequency bands, such as the "L" band (1.3 GHz) or the "H" band (2.2 GHz). However, because of the ubiquity and high-bandwidth nature of mobile communication technologies, it may be desirable to utilize Commercial Off-The-Shelf (COTS) UEs 110 in a wireless communication system 100. But because COTS UEs 110 do not communicate in the desired non-commercial frequencies (e.g., frequency bands used by the military), re-bander units 140 may be utilized to provide this functionality, enabling communication in the desired wireless communication frequencies rather than the UE communication frequency in which the COTS UEs 110 would natively communicate (e.g., commercial frequency bands).

Embodiments of re-bander units 140 are described in more detail below. In brief, a re-bander unit 140 may receive transmit signals from the UE 110 via an antenna port of the UE 110. Rather than transmit the received transmit signal at the UE communication frequency provided by the UE 110, the re-bander unit 140 includes re-banding circuitry that converts the frequency of the transmit signal to a re-banded transmit signal having the desired wireless communication frequency, different than the UE communication frequency. The re-banded transmit signal is then communicated wirelessly (via wireless signal 150). Similar process happens in reverse, where the re-bander unit 140 may receive wireless signals 150 at the desired wireless communication frequency, then re-band the received signal to the UE communication frequency used natively by the UE 110, then provide the re-banded received signal to the UE 110. In this way, the re-bander unit 140 may operate transparently to the UE 110. Moreover, as the underlying communication technology (e.g., LTE) improves, the re-bander units 140 may be used with improved/upgraded equipment, thereby reducing the cost to make system upgrades (where costs are due to improved/upgraded COTS equipment rather improved/upgraded specialized equipment that utilize the desired frequencies).

More broadly, a first UE 110-1 connected to the WAN 120 via a first base station 130-1 may send and receive wireless communications 150-1 at a wireless communication frequency (different from the UE communication frequency) by using the first re-bander unit 140-1. The first base station 130-1 operates to relay communications between the WAN 120 and the first UE 110-1. Similarly, a second UE 110-2 connected to the WAN 120 via a second base station 130-2 may send and receive wireless communications 150-2 at a wireless communication frequency using the second re-bander unit 140-2. The second base station 130-2 operates to relay communications between the WAN 120 and the second UE 110-2. In this way, the UEs 110 may communicate with each other and other UEs (not shown) via the WAN 120 using wireless signals 150 of different frequencies than the native frequencies used by the respective UEs 110.

It can be noted that any of a variety of variations may be implemented in a wireless communication system 100, depending on desired functionality. For example, base stations 130 may also utilize re-bander units in a similar manner as UEs 110. That is, base stations may communicate wirelessly via respective re-bander units that convert wireless signals 150 to frequencies utilized natively by the base stations 130. In this way, commercial base stations may be used which, similar to COTS UEs 110, may be cheaper than alternatives. In LTE, for example, a base station 130 may comprise an Evolved Node B (or eNodeB or eNB). In 5G, a base station 130 may comprise a 5G NR base station (gone or gNB).

The WAN 120 may comprise any of a variety of communication networks. As discussed in the example above, a WAN 120 may comprise an ad hoc network. Additionally or alternatively, the WAN 120 may comprise a traditional mobile communication network (which may, as explained above, use commercial base stations 130). The WAN 120 may additionally or alternatively comprise and/or be connected with any variety of network types, including private networks, public networks (e.g., the Internet), and/or other networks that may utilize any of a variety of wired and/or wireless communication technologies. As such, UEs 110 connected to the wireless communication system 100 may be able to communicate with other devices communicatively coupled with the WAN 120 via the Internet or other networks.

The re-bander unit 140 may come in a variety of form factors, departing on desired functionality. In some embodiments, the re-bander unit 140 may come in a form factor that couples easily to the body of the UE 110, enabling users to treat the UE 110 and re-bander unit 140 as a single physical device. In some embodiments, the re-bander unit 140 may be an individually packaged physical device separate from the UE 110. The re-bander unit 140 may be communicatively coupled to the UE 110 using wired or wireless communication. The re-bander unit 140 may be co-located on a common platform, such as a stationary or static platform or a platform moving at speed, or on different platforms as long as a stable data link can be established and maintained between the UE 110 and the re-bander unit 140.

As discussed above, some existing data communication technologies, such as LTE, have superior data capacity and can support applications requiring very high data throughput, such as live, virtual, and constructive (LVC) and/or other high-data-throughput applications. LTE uses orthogonal frequency division multiplex (OFDM) technology that employs multiple narrow band sub-carriers that are mutually orthogonal in the frequency domain to fulfill the requirements for high data throughput. Data stream is spread across the sub-carriers and transmitted in parallel. As an OFDM-based technology, LTE can be sensitive to frequency drift that can cause intersymbol interference (ISI). Frequency drift can be caused by electronics instability over time and/or temperature. Additionally, when the mobile device is located or operating on a moving platform travelling at high velocities, such as a car, a train, a plane, and the like, the movement of the platform and/or the mobile device can cause Doppler shift in frequency. Although the orthogonality between the sub-carriers mitigates ISI, frequency drift and/or Doppler shift can lead to loss of orthogonality between the sub-carriers. To reduce ISI, guard periods are added at the beginning of the OFDM symbols to separate symbols in time. However, adding guard periods creates an overhead which in turn, can reduce data throughput over the link. Further, adding guard periods or implementing other techniques only allows for correction of Doppler shift up to a threshold velocity. As the velocity of the platform and/or the mobile device continues to increase, data link quality degrades and link errors occur. Eventually, the data link will fail as the velocity of the platform and the mobile device thereon exceeds the threshold velocity. Such situation may occur fairly often when UEs are located on high-speed vehicles, such as aircrafts, which may regularly travel at speeds exceeding current limitations for LTE.

With that in mind, the re-bander unit 140 is designed to handle the frequency drift due to the instability of the electronics as well as the Doppler shift. Embodiments described herein allow the LTE (or other) commercial technology to work in a non-commercial a spectrum and on platforms traveling at speeds not supported by commercial off-the-shelf devices or standards. With the frequency compensated or corrected by the re-bander unit 140, link quality will be improved due to at least in part the reduction in ISI, and the mobile device can travel at speeds much faster than the threshold speed that can be handled by devices and/or standards from a Doppler shift perspective.

As already noted above, although embodiments and terminology provided herein are in reference to LTE or other mobile communication technology, other wireless technologies can be used in addition or as an alternative to LTE to communicate with a wide area network (WAN) or other digital communication network, as will be appreciated by a person of ordinary skill in the art.

Figure 2:
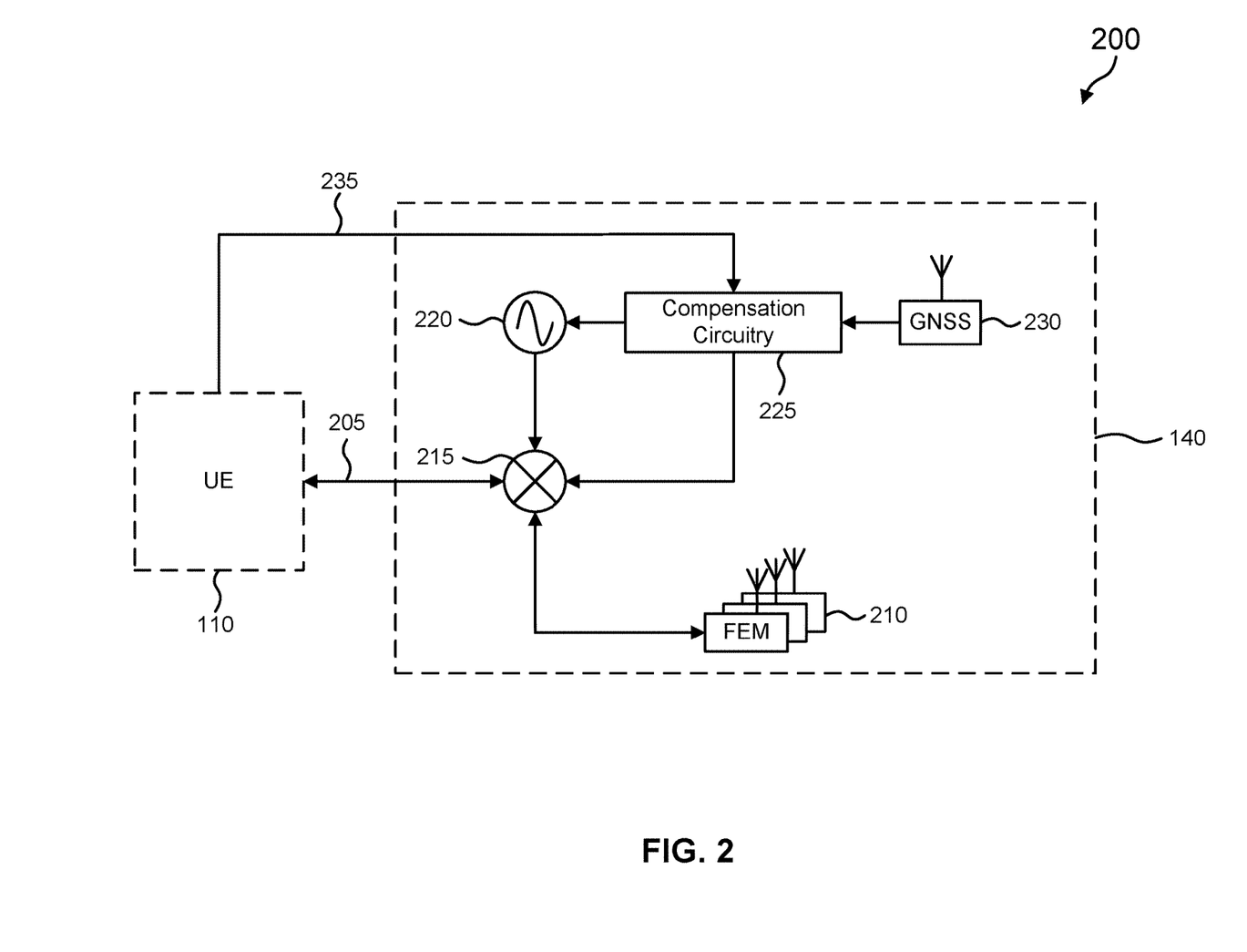
FIG. 2 is a block diagram of an embodiment of a re-bander unit communicatively connected to a user equipment (UE)

FIG. 2 schematically illustrates an exemplary system 200 including a user equipment (UE) 110 and a re-bander unit 140 communicatively coupled to the UE 110 via an interface 205.

As with other figures provided herein, FIG. 2 is provided as a non-limiting example. A person of ordinary skill in the art will appreciate the various components illustrated in FIG. 2 may be combined, separated, rearranged, and/or otherwise altered, depending on desired implementation.

Although labelled as a single interface 205 in FIG. 2, the UE 110 and the re-bander unit 140 may each have an interface for communicatively coupling with the other. The interface of the UE 110 may comprise an antenna port. And thus, the re-bander unit 140 may have an interface configured to couple to the antenna port of the UE 110. It can be further noted that the re-bander unit 140 may itself have an antenna port to allow the re-bander unit 140 to be coupled with one or more external antennas. In some embodiments, the re-bander unit 140 may additionally or alternatively have one or more front end modules 210 and antennas for communicating at a desired wireless communication frequency.

According to some embodiments, the re-bander unit 140 may be used for military applications and may therefore comprise a military design meeting military-grade standards, thereby configured to withstand higher levels of physical impacts, temperature extremes, and/or other environmental hazards than a consumer device. Nonetheless, a consumer-grade design and/or design met to meet other standards may be used if so desired. It will be understood that the re-bander unit 140 may comprise other electrical components not illustrated in FIG. 2.

The re-bander unit 140 may be configured to facilitate communication between the UE 110 and another communication system or device configured to communicate using different frequency bands. For example, the UE 110 may be configured to communicate using a first frequency band, and the other communication system or device may be configured to communicate using a second frequency band different from the first frequency band. The UE 110 may include a COTS UE, such as a mobile device, COTS modem, including but not limited to COTS LTE modem. The first frequency band may include a frequency band designated by communication standards, such as a commercial LTE frequency band, or other standard-specified frequency band designated by various communication standards. The other communication system or device may include a base station, such as base station 130 of FIG. 1, that may communicate with the re-bander unit 140 and/or the UE 110 wirelessly. Thus, the second frequency band may include a wireless communication frequency band, such as the wireless communication frequency band used by the re-bander unit 140 and the base station to communicate with each other. In some embodiments, the second frequency band may include a non-commercial or non-standard-specified frequency band, while in other embodiments, the second frequency band may include a commercial or standard-specified frequency band different from that of the UE 110.

The re-bander unit 140 may include a mixer or synthesizer 215, a reference clock 220, compensation circuitry 225, and a Global Navigation Satellite System (GNSS) receiver 230 that operate together to covert transmit signals from the UE 110 from the first frequency band to the second frequency band, and to convert received signals by the re-bander unit 140 from the second frequency band to the first frequency band. The mixer 215 may include an RF mixer/synthesizer. The reference clock 220 may include a crystal oscillator that outputs a reference frequency. As discussed above, frequency drift can occur over time and/or temperature. Further, the UE 110 or the platform on which the UE 110 is located may be moving at speed, and the relative motion between the UE 110 and the base station can lead to Doppler shift, which in turn can lead to degradation in data link quality and reduction in data throughput. To improve the data link quality and throughput, the reference clock 220 may utilized a voltage controlled crystal oscillator (VCXO), such as a voltage controlled temperature compensated crystal oscillator (VCTCXO). As will be discussed in more detail below, the voltage control function of the reference clock 220, operating together with the GNSS receiver 230, may allow for correction of the Doppler shift caused by the moving UE 110, as well as correction of the frequency drift over time and/or temperature.

The GNSS receiver 230 may obtain timing and/or positioning signals from Global Positioning System (GPS), Global Navigation Satellite System (GLONASS), Galileo, Beidou or other global or regional satellite positioning systems. The timing and/or positioning signals or reference signals obtained based on the timing and/or positioning signals may be output to the compensation circuitry 225 for correcting any frequency drift of the reference frequency of the reference clock 220 and for providing speed compensation or Doppler correction. Although a reference signal may be obtained by the re-bander unit 140 from the UE 110 to correct the reference frequency of the reference clock 220, using the reference signal from the UE 110 may not achieve the desired level of accuracy. This is partly because the reference oscillator in the UE 110, e.g., a COTS UE, is typically very low cost and is not very stable in temperature and time. Any frequency drift over time and/or temperature of the reference oscillator in the UE 110 is corrected by the UE 110 using, e.g., a base station downlink signal as a reference. Thus, the ability of the UE 110 to correct for frequency drift of the reference clock 220 is limited because the UE 110 would need to correct its own reference oscillator as well as the reference clock 220 of the re-bander unit 140.

To correct any frequency drift over time and/or temperature of the reference clock 220, in some embodiments, the GNSS receiver 230 may, based on the timing signal received from the satellite positioning system, output to the compensation circuitry 225 a highly precise timing signal, such as a strobe signal of 1 pps (pulse per second). The compensation circuitry 225 may utilize the strobe signal from the GNSS receiver 230 to stabilize or discipline the reference clock 220. For example, the compensation circuitry 225 may determine the frequency of the reference clock 220 by counting the pulses or oscillations of the reference frequency signal from the reference clock 220 between two strobe signals received from the GNSS receiver 230. If the counted or determined frequency does not match the specification, the control voltage of the reference clock 220 may be adjusted to increase or decrease the reference frequency of the reference clock 220 until the specified reference frequency is obtained. The control voltage of the reference clock 220 may be continuously adjusted using the strobe signal from the GNSS receiver 230 to maintain a highly stable and accurate reference frequency. As will be appreciated by one of ordinary skill in the art, various other techniques may be implemented to discipline the reference clock 220 on the basis of the reference signal provided by the GNSS receiver 230. Because the reference clock 220 can be stabilized by the GNSS receiver 230, a low cost crystal oscillator may be used for the reference clock 220 while still meeting the required accuracy as specified by the underlying communication standards, such as the 3GPP standards. For example, in GNSS available environments, a frequency stability less than 10 ppb can be achieved in a low power and low cost package.

In some embodiments, the GNSS receiver 230 may further output positioning signals to the compensation circuitry 225 based on the positioning signals it receives from the satellite positioning system. The compensation circuitry 225 may be further configured to utilize the positioning signal and/or the timing signal from the GNSS receiver 230 to implement desired speed compensation or Doppler correction to improve the data throughput and/or the link quality and/or stability which may be affected by the platform moving at high speeds.

In some embodiments, the compensation circuitry 225 may be configured to determine the velocity at which the platform and the UE 110 located on the platform are travelling based on the positioning and timing signals received from the GNSS receiver 230. The term "velocity" used herein encompasses both the magnitude of the velocity, i.e., speed, and the direction of travel. The positioning signal may be utilized to determine a distance covered and the direction of travelling, and the timing signal may be utilized to determine the amount of time for the platform or the UE 110 to cover that distance. Based on the distance and time, the speed of the platform and/or the UE 110 can be determined. As will be appreciated by one skilled in the art, various other speed and/or velocity calculation methods may be implemented. In some embodiments, instead of or in addition to determining the speed and/or velocity of the UE 110 based on signals received from the GNSS receiver 230, the compensation circuitry 225 may obtain speed and/or velocity input from the platform on which the UE 110 is located or from the UE 110, if the UE 110 is equipped with such capabilities. Once the speed and/or velocity of the platform and/or the UE 110 is determined, the re-bander unit 140 may apply appropriate Doppler correction to compensate any data link instability and/or data throughput reduction that may be caused by the UE 110 moving at speed.

In some embodiments, the compensation circuitry 225 may determine the relative motion between the UE 110 and the base station and provide Doppler correction accordingly. The location of the base station may be previously obtained by the UE 110/re-bander unit 140 (e.g., via a communication with another base station) and it may be included in an almanac that includes the location of a plurality of base stations, which may be stored in a memory on the UE 110 or the re-bander unit 140 and communicated to the compensation circuitry 225. Based on the location of the base station and the velocity of the UE 110, the relative motion between the UE 110 and the base station may be determined. The compensation circuitry 225 may determine the Doppler shift caused by the relative motion between the UE 110 and the base station and the amount of the Doppler correction to be applied accordingly.

Figure 3:
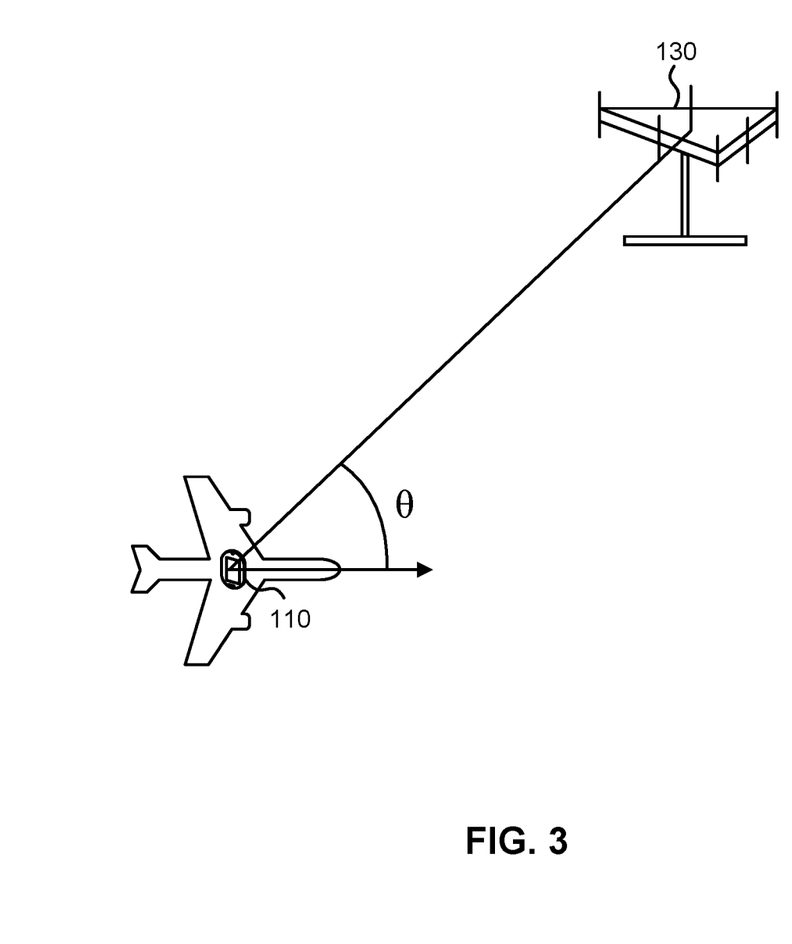
FIG. 3 is a simplified illustration of a moving platform having thereon a user equipment (UE) in communication with a base station.

FIG. 3 is a simplified illustration of a moving platform, such as an aircraft, which may include the UE 110 located thereon and in communication with a base station, such as base station 130. Although not shown, the moving platform may also include thereon the re-bander unit 140. In some embodiments, the Doppler shift that is caused by the movement of the platform, as well as the UE 110 located thereon, relative to the base station 130 may be determined based on the speed v (or magnitude of velocity) of the UE 110, the angle θ between the forward velocity (or direction of travel) of the UE 110 and the line of sight from the UE 110 to the base station 130, and the wireless communication frequency used by the re-bander unit 140 to communicate with the base station 130. The angle θ between the forward velocity of the UE 110 and the line of sight from the UE 110 to the base station 130 may be determined by, e.g., the compensation circuitry 225, based on the location information of the base station 130 and the position information of the UE 110. The angle θ and speed v may be updated dynamically as the platform and the UE 110 continues to move. One non-limiting example of calculating the Doppler shift caused by the relative motion between the UE 110 and the base station 130 may include the following equation:

$$F_D = \frac{v \cdot \cos\theta}{c} F_w$$

where FD represents the Doppler shift, $F_w$ represents the wireless communication frequency used by the re-bander unit 140 to communicate with the base station 130, and c represents the speed of light. As will be appreciated by one of ordinary skill in the art, other calculation methods or equations may be utilized for determining the Doppler shift based on various considerations. In some embodiments, the relativistic Doppler shift may be determined or calculated by taking into account effects described by the special theory of relativity, and a corresponding Doppler correction may be applied to correct such relativistic Doppler shift.

Based on the determined Doppler shift, the compensation circuitry 225 may apply the Doppler correction accordingly to maintain the quality and stability of the data link between the UE 110 and the base station. In some embodiments, the compensation circuitry 225 may apply an amount of Doppler correction corresponding to the calculated Doppler shift. Various amounts of Doppler correction may be applied based on different considerations to establish and maintain a stable data link between the base station, the re-bander unit 140, and the UE 110.

The compensation circuitry 225 may apply the Doppler correction by changing the reference frequency of the reference clock 220 accordingly. For example, if the UE 110 is travelling generally towards the base station (i.e., $\theta<90°$), then the compensation circuitry 225 may reduce the reference frequency of the reference clock 220 by the amount of Doppler correction determined. If it is determined that the UE 110 is travelling generally away from the base station (i.e., $\theta>90°$), then the compensation circuitry 225 may increase the reference frequency of the reference clock 220 by the amount of Doppler correction determined. The reference frequency of the reference clock 220 may be adjusted in a manner similar to how the reference frequency of the reference clock 220 may be changed based on the strobe signal received from the GNSS receiver 230 as discussed above. Because the mixer 215 re-bands the signals from the UE 110 to the second frequency band based on the reference frequency of the reference clock 220, the re-banding accounts for the Doppler effect caused by the UE 110 moving at speed, thereby maintaining the data throughput and link quality/stability.

In some embodiments, the location of the base station may not be available or known to the UE 110 and/or the re-bander unit 140, and a communication connection between the UE 110 and a base station may not be established while the UE 110 is already traveling at high velocity. Nonetheless, Doppler correction may still be beneficial to initiating or establishing a communication connection between the UE 110 and a base station even without the location information of the base station. In some embodiments, a maximum Doppler shift may be determined based on the speed of the UE 110 without regard to the direction of travel of the UE 110. Such maximum Doppler shift may correspond to the UE 110 traveling directly toward (i.e., $\theta=0°$) or directly away from (i.e., $\theta=180°$) a base station.

Once the maximum Doppler shift is determined, the compensation circuitry 225 may apply an amount of Doppler correction based on the maximum Doppler shift. In some embodiments, the compensation circuitry 225 may apply an amount of Doppler correction corresponding to the maximum Doppler shift. For example, the compensation circuitry 225 may increase the reference frequency of the reference clock 220 by the maximum Doppler shift and maintain the increased reference frequency for a first predetermined period of time. If a connection between the UE 110 and a base station is not established during the first predetermined period of time, the compensation circuitry 225 may decrease the reference frequency of the reference clock 220 by the maximum Doppler shift and maintain the decreased reference frequency for a second predetermined period of time, which may be the same as or different from the first predetermined period of time. If a connection is not established during the second predetermined period of time, the compensation circuitry 225 may switch back to increasing the reference frequency of the reference clock 220 and alternate between increasing and decreasing the reference frequency of the reference clock 220 until a connection is established between the UE 110 and a base station.

In some embodiments, instead of applying an amount of Doppler correction equal to the maximum Doppler shift, the compensation circuitry 225 may apply an amount of Doppler correction corresponding to a portion of the maximum Doppler shift, such as 75%, 50%, 25%, or other appropriate percentage of the maximum Doppler shift based on various considerations. In some embodiments, instead of alternating between increasing and decreasing the reference frequency of the reference clock 220 by an equal amount of Doppler correction when attempting to establish a connection between the UE 110 and a base station, the compensation circuitry 225 may increase and/or decrease the reference frequency of the reference clock 220 by a varying amount of Doppler correction. For example, the compensation circuitry 225 may increase and/or decrease the reference frequency of the reference clock 220 by a relative small amount of Doppler correction and then gradually increase the amount of Doppler correction in adjusting the reference frequency of the reference clock 220. In some embodiments, the compensation circuitry 225 may increase and/or decrease the reference frequency of the reference clock 220 by a relative large amount of Doppler correction and then gradually decrease the amount of Doppler correction in adjusting reference frequency of the reference clock 220. Various other adjustment schemes may be implemented.

Apply the Doppler correction even before a connection is established between the UE 110 and the base station can be beneficial. This is because in order to establish a connection, the UE 110 needs to perform an initial cell search and timing and frequency synchronization. In this process, the LTE standards specify two synchronization signals: the primary synchronization signal (PSS) and the secondary synchronization signal (SSS), and the initial operations performed by the cell search module involve processing PSS and SSS. When the UE 110 is moving at high velocities, performing a proper cell search and synchronization can be challenging because the synchronization signals PSS and SSS may be shifted by the Doppler effect and ISI may result. As discussed above, LTE, an OFDM based technology, can be very sensitive to frequency shift and ISI. Although the infrastructure of many communication networks is equipped with the capabilities of handling Doppler shift up to a threshold speed, e.g., 500 km/hr for LTE, when the UE 110 is moving at a speed beyond that threshold speed, synchronization or locking-onto the base station frequencies can be very difficult, if possible at all. Applying the Doppler correction prior to establishing the connection using any of the previously discussed methods without relying on the location of the base station, the shift in the synchronization signals PSS and SSS can be minimized, and the search and synchronization process is thus facilitated by such Doppler correction to ensure a reliable connection between the UE 110 and the base station. Once a connection with desired quality and stability is established, location of the connected base station and other nearby base stations may be obtained from the base station, the re-bander unit 140 may apply the Doppler correction based on the relative motion between the UE 110 and the base station in a manner similar to that discussed above. In some embodiments, even after a connection is established and/or with the knowledge of the location of the base station, the re-bander unit 140 may continue to apply the Doppler correction based on the maximum amount of Doppler shift (or a varying or non-varying portion thereof) that may be caused by the UE 110 without calculating or determining the relative motion between the UE 110 and the base station for ease of calculation or other considerations.

In some embodiments, during the initial search, the data link quality and/or stability may be determined based on various connection parameters, which may be measured or monitored by the UE 110 typically, but can be measured or monitored by the re-bander unit 140 in some embodiments. Depending on the underlying communication technology, the measured connection parameters may include parameters related to the signal strength, such as received signal strength indicator (RSSI) which can be measured in dBm. The measured connection parameters may further include parameters related to the signal quality, such as signal to interference plus noise ratio (SINR) which can be measured in dB and can indicate the throughput capacity of the channel, reference signal received quality (RSRQ) which is measured in dB and indicates the quality of the received reference signal, reference signal received power (RSRP) which can be measured in dBm and indicates the power of, e.g., LTE reference signals spread over the full bandwidth and narrowband. The measured connection parameters may further include parameters related to link stability, such as parameters indicating the link's probability to persist for a predetermined time span. As one of ordinary skill in the art will appreciate, various other connection parameters may be measured and monitored as various underlying communication technologies may be utilized.

The re-bander unit 140, in particular the compensation circuitry 225, may be configured to adjust the amount of Doppler correction to be applied based on one or more of the various connection parameters monitored. For example, a control function may be implemented in the compensation circuitry 225, such as by implementing a control loop, including but not limited to, a proportional-integral-derivative (PID) control loop, for continuously adjusting the Doppler correction to be applied based on the connection parameter input 235 from the UE 110. In some embodiments, the data link quality and/or stability may be monitored even after a connection is established between the UE 110 and the base station. Such monitoring may be performed continuously or intermittently. The compensation circuitry 225 may be further configured to apply the Doppler correction based on the monitored data link quality and/or stability, in addition to or as an alternative to applying the Doppler correction based on the relative motion between the UE 110 and the base station. In some embodiments, such control function or control loop may be omitted because the Doppler correction applied using the speed/velocity of the UE 110 and/or the location of the base station can be sufficient for achieving quality and stable data link. The connection parameter input 235 can thus also be omitted.

In some embodiments, when locations of other nearby base stations are known, the compensation circuitry 225 may be further configured to apply an appropriate amount of Doppler correction taking into account the location of the current base station the UE 110 is currently communicating with, as well as the location of the next base station with which the UE 110 will be communicating with next. For example, when the UE 110 may be leaving the coverage area of the current base station and entering the coverage area of the next base station, the compensation circuitry 225 may be configured to apply a combination of the Doppler shift calculated based on the location of the current base station and the Doppler shift calculated based on the location of the next base station. In some embodiments, the combined Doppler shift may be an average of the two calculated Doppler shift values, which may result in a zero or close to zero value of the combined Doppler shift because one of the calculated Doppler shift may be positive while the other calculated Doppler shift may be negative. In some embodiments, the combined Doppler shift may be a weighted average of the two calculated Doppler shift values, and the weighting may vary as the UE 110 travels away from the current base station and towards the next base station. Applying a Doppler correction based on the combined Doppler shift may be performed by the compensation circuitry 225 as the UE 110 enters into the overlapping area covered by both base stations or even before the UE 110 enters into the overlapping area. With such configuration, the handover may occur without loss or interruption of the data link between the UE 110 and the base stations.

As mentioned above, the various components of the re-bander unit 140 may operate together to covert transmit signals from the UE 110 to the wireless communication frequency supported by the base station, as well as to convert the received signals to the frequency native to the UE 110. For both the transmit signals and the received signals, Doppler correction may be applied in a similar manner based on the speed of the UE 110, the direction of travel of the UE 110, and/or the location of the base station. However, depending on the form of duplex, i.e., FDD and/or TDD, the re-bander unit 140 may vary. For example, in a TDD system, the re-bander unit 140 may include a single reference clock, such as the reference clock 220, and a single mixer, such as the mixer 215, for re-banding both the transmit signals and the received signals.

Figure 4A:
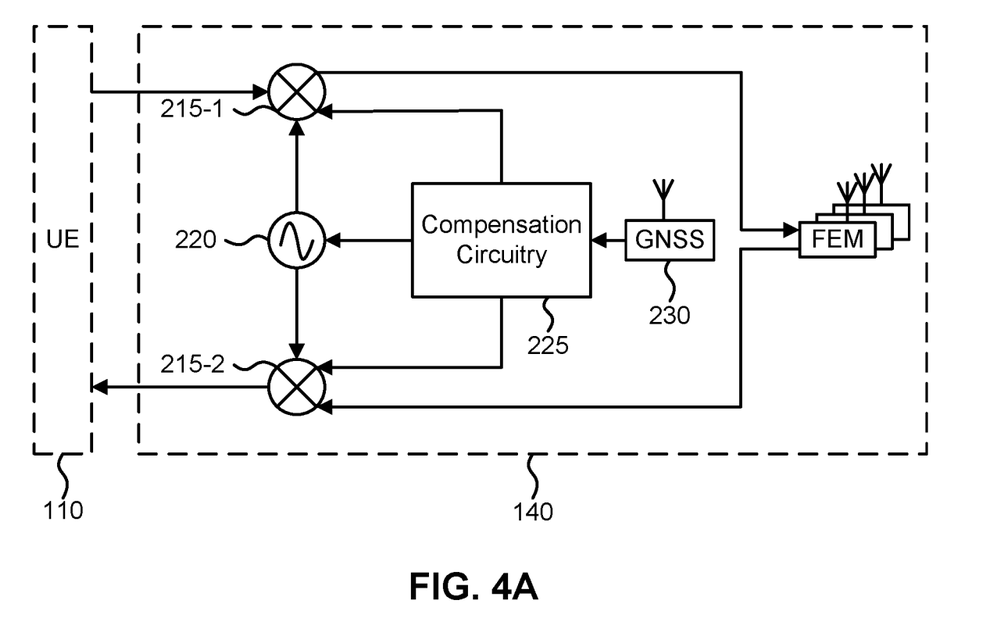
FIGS. 4A and 4B are block diagrams of additional embodiments of a re-bander unit communicatively connected to a user equipment (UE)
Figure 4B:
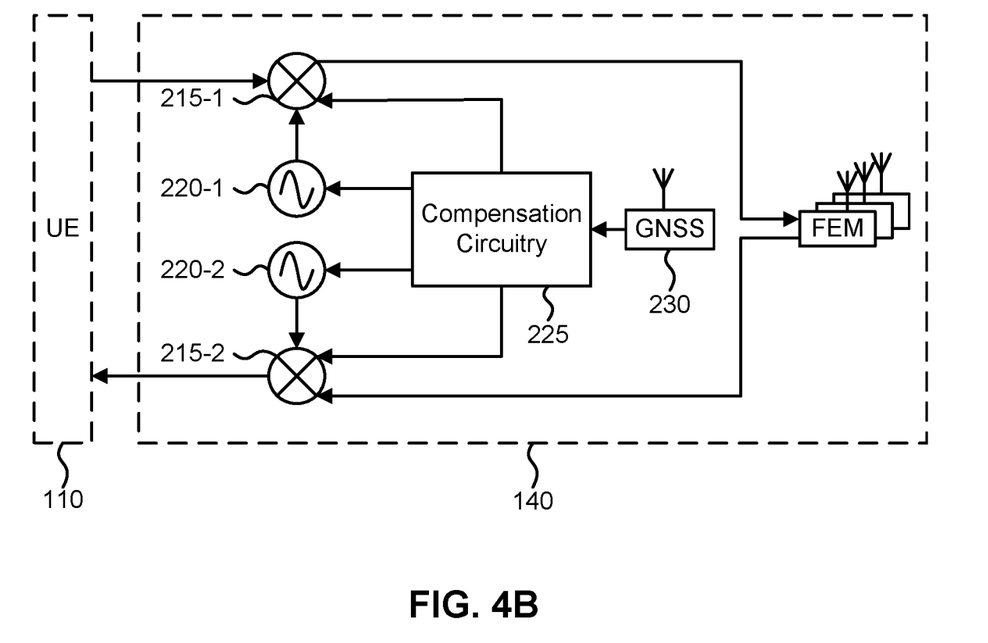

In a FDD system, such as shown in FIG. 4A, the re-bander unit 140 may include two mixers 215-1, 215-2. The mixer 215-1 may be configured to reband the transmit signals, while the mixer 215-2 may be configured to reband the received signals. However, common reference clock 220, compensation circuitry 225, and GNSS receiver 230 may be used for re-banding both the transmit signals and the received signals. In some embodiments, separate reference clocks 220-1 and 220-2 may be employed for re-banding the transmit signals and the received signals, respectively, as shown in FIG. 4B. In some embodiments, separate compensation circuitry may be provided for re-banding the transmit signals and for re-banding the received signals, respectively.

Although a UE and a base station are described in the exemplary embodiments, the re-bander unit 140 may be utilized to facilitate communication between other communication systems and/or devices that are configured to communicate using different frequency bands. For example, the re-bander unit 140 may be utilized to facilitate communication between two UEs 110-1 and 110-2 that may be configured to communicate using different frequency bands. At least one of the UEs 110-1 and 110-2 may be moving.

Further, in some embodiments, the re-bander unit 140 may be located on the same moving platform as the UE 110. In some embodiments, the re-bander unit 140 may be located at the base station, and thus may be stationary or static. When the re-bander unit 140 is located at the base station, in some embodiments, the re-bander unit 140 may obtain speed information of the UE 110 for Doppler correction through a connection link other than the high data rate communication link between the UE 110 and the base station. In some embodiments, the speed information of the UE 110 may be communicated to the re-bander unit 140 using the same high data rate communication link once such communication is established. In some embodiments, even before such communication link is established, the re-bander unit 140 may apply a predetermined amount of Doppler correction in an attempt to establish the communication link. The predetermined amount of Doppler correction may be constant or varying, and/or may alternate between positive and negative.

As discussed above, the infrastructure of the underlying communication network may be equipped with capabilities to provide for Doppler correction up to a threshold speed limit as specified by the communication standards. Depending on the communication technologies and the standards, the threshold speed limit may vary. To ensure connection between the UE 110 and the base station, Doppler correction may be applied when the UE 110 is traveling at a speed exceeding that threshold speed limit. However, in some embodiments, Doppler correction may be applied even when the UE 110 is traveling at a speed below that threshold speed limit because as the speed of the UE 110 gradually increases, the data throughput and link stability of the connection between the UE 110 and the base station may degrade. In some embodiments, Doppler correction may be applied as soon as the UE 110 is traveling at a speed exceeding 50% of the threshold speed limit in some embodiments, and may be applied when the UE 110 is traveling at a speed exceeding 30%, 40%, 60%, 70%, 80%, or 90% of the threshold speed limit in other embodiments.

In some embodiments, instead of or in addition to applying Doppler correction based on a threshold speed as discussed above, Doppler correction may be applied based on threshold values related to data link quality and/or stability. As discussed above, various connection parameters indicating the data link quality and/or stability may be received as input from the UE 110 to the compensation circuitry 225. Threshold values may be set for each monitored parameters. When one or more monitored parameters fall below the respective threshold values, Doppler correction may be applied by the compensation circuitry 225 to maintain desired data link quality and stability.

In the exemplary embodiments discussed above, a GNSS receiver, such as the GNSS receiver 230, is integrated in the re-bander unit or circuitry, such as the re-bander unit 140. In some embodiments, the GNSS solution may be embedded on the COTS UE itself. The COTS UE may be configured to receive timing and/or positioning signals from a satellite positioning system. Based on the timing and/or positioning signals received, the COTS UE may determine the Doppler correction or other various information that may be used for determining the Doppler correction. The COTS UE may then provide the determined Doppler correction or other information to the re-bander mixer to correct for the Doppler shift. In some embodiments, velocity information and/or position information of the moving UE may be obtained directly from the platform on which the UE is located. Thus, a GNSS receiver, such as the GNSS receiver 230 shown in FIGS. 2, 4A, and 4B may be omitted. The re-bander unit may include a microprocessor and/or a memory containing code that can calculate the Doppler shift for applying the Doppler correction by retuning the mixer and/or the reference clock. As discussed above, the Doppler correction may be applied by adjusting the reference frequency of the reference clock. In some embodiments, the mixer may be configured to include hardware components and/or software modules to correct for the Doppler shift, in addition or as an alternative to adjusting the reference frequency of the reference clock.

Figure 5:
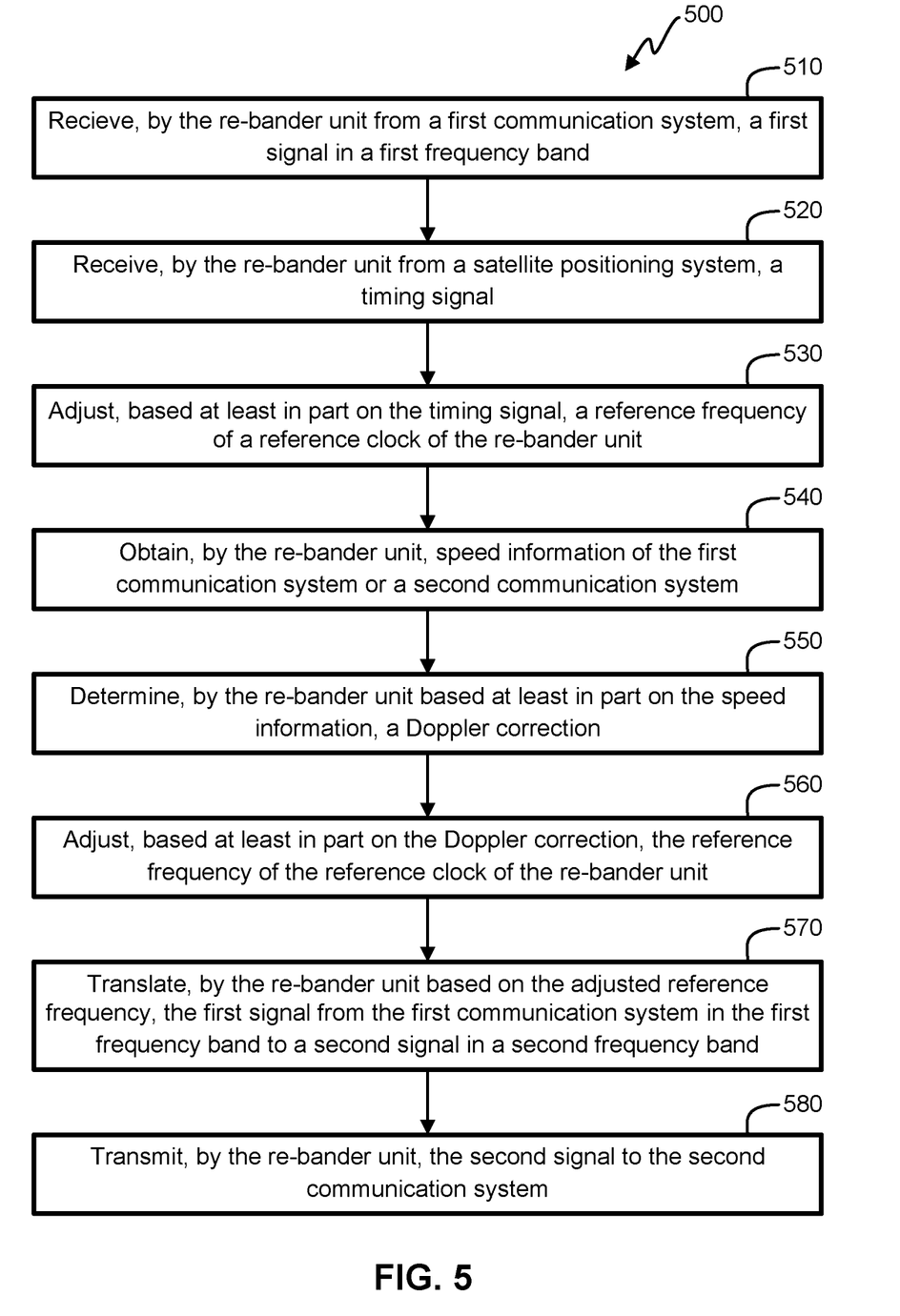
FIG. 5 is a flow diagram, illustrating a method of performing frequency re-banding of a signal, according to an embodiment.

FIG. 5 is a flow diagram, illustrating a method of correcting frequency drift and performing Doppler correction during re-banding, according to an embodiment. The method 500 can be implemented by the re-bander unit 140 as described in the embodiments above and illustrated in FIGS. 2, 4A, and 4B, for example. As such, means for performing one or more of the functions illustrated in the various blocks of FIG. 5 may comprise hardware and/or software components of a re-bander unit 140. As with other figures herein, FIG. 5 is provided as an example. Other embodiments may vary in functionality from the functionality shown. Variations may include performing additional functions, substituting and/or removing select functions, performing functions in a different order or simultaneously, and the like.

The method 500 can be implemented to facilitate communication between two communication systems or devices, at least one of which is moving at a speed exceeding a threshold speed. The threshold speed may be any of the threshold speeds discussed above and can be standard based or non-standard based. One of the first communication system/device or the second communication system/device may include a UE. In some embodiments, the other one of the first communication system/device or the second communication system/device may include a base station. However, it should be noted that the principles discussed in the embodiments are not limited to communications between UEs and base stations. Thus, in some instances, both the first and second communication systems/devices may include UEs. At least one of the UEs may be moving at speed and communicatively coupled to a re-bander unit, such as re-bander unit 140 as described above. In the case where both UEs may be moving at speed, each UE may be communicatively coupled with a re-bander unit.

The method 500 at block 510 may include receiving, by a re-bander unit, a first signal from the first communication system/device. The first signal may include a transmit signal sent by the first communication system/device using a first frequency band, i.e., a communication frequency at which the first communication system/device natively communicates.

At block 520, the method 500 may include receiving, by the re-bander unit from a satellite positioning system, a timing signal. As discussed, the re-bander unit may include a GNSS receiver for receiving timing and/or positioning signals from the satellite positioning system.

At block 530, the method 500 may include adjusting, based at least in part on the timing signal, a reference frequency of a reference clock of the re-bander unit. Such adjustment may correct for any frequency drift in time and/or temperature.

At block 540, the method 500 may include obtaining, by the re-bander unit, speed information of the first communication system/device or the second communication system/device that is/are moving. The speed information may indicate the speed and/or direction of travel of the moving first and/or second communication systems/devices. As discussed above, the speed information may be determined based on the timing and/or positioning signals received from the satellite positioning system in some embodiments. In some embodiments, the speed information may be obtained by the re-bander unit from the moving platform on which the moving first and/or second communication system/device may be located. In some embodiments, the first and/or second communication systems/devices may be equipped with the functionality of determining their respective speed and/or direction of travel. The first and/or second communication systems/devices may be equipped with their own GNSS receivers for receiving the timing and/or positioning signals for determining the speed and/or direction of travel thereof. In some embodiments, the speed information may indicate the relative motion between the first communication system/device and the second communication system/device.

To determine the relative motion, the re-bander unit may further obtain location of the first and/or second communication systems/devices.

At block 550, the method 500 may include determining, by the re-bander unit based on the speed information, a Doppler correction. The Doppler correction may be determined based on speed alone, based on the combination of speed and direction of travel, based on location of the first and/or second communication systems/devices, and so forth. The Doppler correction may be further determined based at least in part on the data link quality and stability. As discussed above, various amounts of Doppler correction may be applied based on the calculated Doppler shift caused by the movements of the first and/or second communication systems/devices.

At block 560, the method 500 may include adjusting, based at least in part on the Doppler correction, the reference frequency of the reference clock of the re-bander unit. As explained above, the Doppler correction may be applied during communication between the first and second communication systems/devices in some embodiments. In some embodiments, the Doppler correction may be applied even before a connection between the first and/or second communication systems/devices is established. In some embodiments, the Doppler correction may be applied without the knowledge of the location of at least one of the first or second communication system/device. As also discussed above, feedback loop may be implemented to continuously adjust the Doppler correction to be applied based on the data link quality and/or stability.

At block 570, the method 500 may include translating, by the re-bander unit based on the further adjusted reference frequency, the first signal to a second signal using a second frequency band, such as a wireless communication band used by a base station or another UE.

At block 580, the second signal is transmitted by the re-bander unit to the second communication system via the wireless communication connection between the re-bander unit and the second communication system/device.

As noted in the embodiments above, the re-bander unit may re-band both the transmit signals from the first communication system/device and the received signals from the second communication system/device to be received by the first communication system/device. Thus, the method 500 may further include receiving, by the re-bander unit from the second communication system, a third signal in a third frequency band, translating, by the re-bander unit based on the adjusted reference frequency, the third signal to a fourth signal in a fourth frequency band, and transmitting, by the re-bander unit, the fourth signal to the first communication system. Depending on the form of duplex, i.e., TDD or FDD, the third frequency band may be the same as or different from the second frequency band, and the fourth frequency band may be the same as or different from the first frequency band.

The technology described herein may be utilized to improve data throughput and data link quality and stability between two communication systems or devices configured to communicate using different frequency bands, and at least one of the communication systems or devices may be moving at high velocities. The communication system or device may be moving at speed itself or may be located on a high speed platform, such as cars, trains, planes, jets, satellites, and any other fast moving platform. The combination of the re-banding functionality and the Doppler correction functionality allows low cost communication systems or devices, such as COTS UEs, to be used on very high speed platforms while communicating using different frequency bands of a network, such as a commercial and/or private LTE network, that may support high data throughput but may lack to ability to handle the Doppler shift caused by the high speed of the platforms. Such combined functionality can be particularly useful for operation on fast moving airframes where a re-banded UE acts as a data link from the airframe where video, telemetry and other data could be sent back over a high data throughput network, or the re-banded UE could be used in a "relay mode" and acts as a backhaul data link for a base station on the airframe. The cost associated with the technology described herein may be very low because COTS units, such as COTS UE may be used. The technology may be implemented in a very compact unit (typically in the size of a small mobile phone) that incorporates a COTS UE along with re-bander circuitry having a GNSS disciplined frequency reference source.

Various components may be described herein as being "configured" to perform various operations. Those skilled in the art will recognize that, depending on implementation, such configuration can be accomplished through design, setup, placement, interconnection, and/or programming of the particular components and that, again depending on implementation, a configured component might or might not be reconfigurable for a different operation. Moreover, for many functions described herein, specific means have also been described as being capable of performing such functions. It can be understood, however, that functionality is not limited to the means disclosed. A person of ordinary skill in the art will appreciate that alternative means for performing similar functions may additionally or alternatively be used to those means described herein.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that may comprise memory may comprise non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium.

Such a medium may take many forms, including but not limited to, non-volatile media, volatile media, and transmission media. Common forms of computer-readable media include, for example, magnetic and/or optical media, any other physical medium, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals, which may be stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms "and," "or," and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A frequency re-bander unit, comprising:
an interface configured to communicate with a first communication system in a first frequency band, wherein:
the first communication system includes a user equipment (UE), and the UE uses cellular standards-based communication; and
re-banding circuitry comprising:
a reference clock configured to produce a reference frequency;
a Global Navigation Satellite System (GNSS) receiver configured to:
receive a timing signal from a satellite positioning system different from the first communication system;
compensation circuitry configured to:
determine speed information of the first communication system, wherein the speed information is indicative of at least a speed of the first communication system;
determine a Doppler correction based on the speed information of the first communication system;
determine a maximum Doppler shift causable by the first communication system; and
apply the Doppler correction corresponding to the maximum Doppler shift by adjusting the reference frequency of the reference clock based at least in part on the maximum Doppler shift until a connection is established between the first communication system and a second communication system; and
a mixer configured to translate signals received from the first communication system to a second frequency band based at least in part on the adjusted reference frequency of the reference clock, wherein the mixer is further configured to cause the translated signals to be transmitted in the second frequency band to the second communication system different from the satellite positioning system.

2. The frequency re-bander unit of claim 1, wherein the GNSS receiver is further configured to receive a positioning signal from the satellite positioning system, and wherein the compensation circuitry is further configured to determine the speed information of the first communication system based at least in part on the positioning signal.

3. The frequency re-bander unit of claim 2, wherein:
the speed information is further indicative of relative motion between the first communication system and the second communication system configured to receive the translated signals; and
the compensation circuitry is further configured to:
obtain a location of the second communication system; and
determine the relative motion between the first communication system and the second communication system based at least in part on the positioning signal and the location of the second communication system.

4. The frequency re-bander unit of claim 1, wherein the compensation circuitry is further configured to determine the speed information of the first communication system based at least in part on speed information obtained from the first communication system or a moving platform on which the first communication system is located.

5. The frequency re-bander unit of claim 1, wherein the compensation circuitry is further configured to determine the Doppler correction based at least in part on the maximum Doppler shift causable by the first communication system.

6. The frequency re-bander unit of claim 1, wherein the compensation circuitry is further configured to determine and adjust the Doppler correction based at least in part on predetermined connection parameters indicative of data link quality or data link stability.

7. The frequency re-bander unit of claim 1, wherein the compensation circuitry is further configured to adjust the reference frequency of the reference clock upon determining that the first communication system is moving at a speed equal to or exceeding a threshold speed.

8. The frequency re-bander unit of claim 1, wherein the user equipment (UE) uses LTE and/or 5G cellular standards-based communication.

9. The frequency re-bander unit of claim 1, wherein the second communication system includes a base station.

10. The frequency re-bander unit of claim 1, wherein the reference clock comprises a voltage controller configured to adjust the reference frequency of the reference clock based at least in part on at least one of a strobe signal received from the GNSS receiver or the Doppler correction determined by the compensation circuitry.

11. A method for correcting Doppler shift using a re-bander unit, the method comprising:
receiving, from a first communication system, a first signal in a first frequency band, wherein:
the first communication system includes a user equipment (UE), and
the UE communicates using cellular standards-based communication;
receiving, from a satellite positioning system different from the first communication system, a timing signal;
adjusting, based at least in part on the timing signal, a reference frequency of a reference clock of the re-bander unit;
obtaining speed information of the first communication system, wherein the speed information is indicative of at least a speed of the first communication system;
determining, based on the speed information, a Doppler correction;
determining a maximum Doppler shift causable by the first communication system;
applying the Doppler correction corresponding to the maximum Doppler shift by adjusting, based at least in part on the maximum Doppler correction shift until a connection is established between the first communication system and a second communication system, the reference frequency of the reference clock of the re-bander unit;
translating, based on the adjusted reference frequency, the first signal in the first frequency band to a second signal in a second frequency band; and
transmitting the second signal in the second frequency band to [[a]]the second communication system different from the satellite positioning system.

12. The method of claim 11, further comprising:
receiving, from the satellite positioning system, a positioning signal, wherein the speed information of the first communication system is obtained based at least in part on the positioning signal received from the satellite positioning system.

13. The method of claim 12, wherein the speed information is further indicative of relative motion between the first communication system and the second communication system configured to receive the second signal, the method further comprising:
obtaining a location of the second communication system; and
determining the relative motion between the first communication system and the second communication system based at least in part on the positioning signal and the location of the second communication system.

14. The method of claim 11, wherein the speed information of the first communication system is obtained from the first communication system or a moving platform on which the first communication system is located.

15. The method of claim 11, further comprising:
determining at least one of data link quality or data link stability between the first communication system and the second communication system configured to receive the second signal, wherein adjusting the reference frequency of the reference clock comprises adjusting the reference frequency of the reference clock based on at least one of the data link stability or the data link stability.

16. The method of claim 11, further comprising:
receiving, from the second communication system, a third signal in the second frequency band;
translating, based on the adjusted reference frequency, the third signal from the second communication system in the second frequency band to a fourth signal in the first frequency band; and
transmitting the fourth signal to the first communication system.

17. The method of claim 11, further comprising:
receiving, from the second communication system, a third signal in a third frequency band, wherein the third frequency band is different from the second frequency band;
translating, based on the adjusted reference frequency, the third signal from the second communication system in the third frequency band to a fourth signal in a fourth frequency band, wherein the fourth frequency band is different from the first frequency band; and transmitting the fourth signal to the first communication system.

18. The method of claim 11, wherein the user equipment (UE) uses LTE and/or 5G cellular standards-based communication.

19. The method of claim 11, wherein transmitting the second signal to the second communication system comprises transmitting the second signal to a base station.

\* \* \* \* \*